(12) United States Patent
Irwin

(10) Patent No.: US 10,563,943 B2
(45) Date of Patent: Feb. 18, 2020

(54) WEAPON LOCKING APPARATUS

(71) Applicant: Kelly Irwin, Rogers, AR (US)

(72) Inventor: Kelly Irwin, Rogers, AR (US)

(73) Assignee: Assembled Products Corporation, Rogers, AR (US)

( * ) Notice: Subject to any disclaimer, the term of this patent is extended or adjusted under 35 U.S.C. 154(b) by 276 days.

(21) Appl. No.: 15/079,942

(22) Filed: Mar. 24, 2016

(65) Prior Publication Data

US 2017/0276446 A1  Sep. 28, 2017

(51) Int. Cl.
*E05B 73/00* (2006.01)
*F41A 17/06* (2006.01)
*B60R 7/14* (2006.01)

(52) U.S. Cl.
CPC ............... *F41A 17/06* (2013.01); *B60R 7/14* (2013.01)

(58) Field of Classification Search
CPC .......... F41A 17/02; F41A 17/06; F41A 23/18; F41C 33/06; B60R 7/14; Y10T 70/40; E05B 73/00
USPC ............. 70/14, 18, 19, 57, 58, 62, 209, 232; 211/4, 8, 9, 64
See application file for complete search history.

(56) References Cited

U.S. PATENT DOCUMENTS

| | | | |
|---|---|---|---|
| 2,316,995 A * | 4/1943 | Smith | A47B 81/005 211/64 |
| 3,326,385 A | 6/1967 | Pinkerton et al. | |
| 3,857,491 A | 12/1974 | Townsend et al. | |
| 4,747,280 A | 5/1988 | Shaw | |
| 4,881,386 A | 11/1989 | Glines | |
| 4,949,559 A | 8/1990 | Glines | |
| 5,339,966 A | 8/1994 | Bastiaans | |
| 5,350,094 A * | 9/1994 | Morford | B60R 7/14 211/64 |
| 5,683,021 A * | 11/1997 | Setina | B60R 7/14 206/317 |
| 5,779,120 A | 7/1998 | Morford | |
| 5,934,112 A | 8/1999 | Rice et al. | |
| 5,979,846 A | 11/1999 | Fluhr | |
| 6,438,885 B1 | 8/2002 | Murray et al. | |
| 6,584,719 B1 | 7/2003 | Morford | |
| 7,047,771 B2 | 5/2006 | Tanos | |
| 8,471,676 B1 * | 6/2013 | Lizaso | E05G 5/003 340/5.2 |
| 8,991,224 B2 * | 3/2015 | Zalavari | A47B 81/00 206/317 |
| 2002/0158095 A1 * | 10/2002 | Vor Keller | E05B 47/0603 224/244 |
| 2012/0291327 A1 * | 11/2012 | Boutot, Jr. | F41C 33/0263 42/70.11 |
| 2013/0269509 A1 * | 10/2013 | Irwin | F41A 23/005 89/37.01 |
| 2014/0262874 A1 * | 9/2014 | Heim | F41C 33/06 206/317 |

(Continued)

*Primary Examiner* — Suzanne L Barrett
(74) *Attorney, Agent, or Firm* — Boyd D. Cox

(57) ABSTRACT

A locking apparatus having a magnetic lock for releasably securing an article, such as a weapon, and for deterring unauthorized removal of the secured article from the apparatus. The locking apparatus has a lock head with a sliding latch that can be moved between opened and closed positions in response to a magnetic lock to which coded signals are transmitted by the user via a control module to actuate the magnetic lock.

28 Claims, 5 Drawing Sheets

(56) References Cited

U.S. PATENT DOCUMENTS

| | | | |
|---|---|---|---|
| 2014/0305175 A1* | 10/2014 | Irwin | F41A 23/18 70/14 |
| 2015/0114861 A1* | 4/2015 | Heim | E05G 1/005 206/317 |
| 2015/0184428 A1* | 7/2015 | Zalavari | E05B 73/00 70/13 |
| 2017/0030114 A1* | 2/2017 | Fisher | B60R 7/14 |
| 2017/0082388 A1* | 3/2017 | Plourde | F41A 17/06 |

* cited by examiner

WEAPON LOCKING APPARATUS

Priority for this application is claimed from U.S. Provisional Application No. 62/138,112 entitled "Weapon Locking Apparatus" filed on Mar. 25, 2015

BACKGROUND

The present invention is directed to a weapon locking apparatus for releasably securing a weapon. The locking apparatus has a lock head that can be locked to deter unauthorized access to a weapon secured by the locking apparatus. Conversely, the lock head can be unlocked to allow easy access to a weapon stored therein. Additionally, the weapon locking apparatus can releasably secure a variety of articles other than weapons.

There is a need for means by which police and other safety officers can safely secure their weapons against theft and unauthorized use, yet maintain ready access to those weapons. In addition, it is desirable to be able to securely lock a weapon in one's home or business in order to deter theft or unauthorized access.

Weapons are typically stored on gun racks that can be mounted within motor vehicles or gun cabinets. To deter unauthorized access, some weapons are secured onto such racks by releasable locking brackets. When a weapon is needed, a locking bracket can be opened by an authorized user in order to release the weapon. Once released, the weapon can be removed from the gun rack for use.

The prior art sets forth lock mechanisms used to secure weapons on gun racks which comprise arm elements that pivot between opened and closed positions. A drawback of these prior art devices is that when the lock mechanism is in an opened position, the arm element can interfere with weapon removal from or weapon replacement into the gun rack.

Therefore, there is a need for a locking apparatus for a weapon having a latch head with a latch that can slide into and out of engagement with a chassis while remaining unobtrusive when the locking apparatus is in an opened position.

SUMMARY

The present invention embodies a locking apparatus having a lock head with a primary magnetic lock for securing an article such as a gun in a desired location. The locking apparatus can be used in combination with a gun mounting rack to releasably secure a weapon thereto. The lock head has a sliding latch that can be moved between opened and closed positions when unlocked in response to a coded signal transmitted by an authorized user. Consequently, the weapon locking apparatus can hold and secure a weapon against unauthorized removal and readily release the weapon for use when prompted by an authorized user. The weapon locking apparatus also includes a secondary manual lock that can be used as an alternative to the primary magnetic lock.

It is an object of the present invention to provide a weapon locking apparatus that can secure a weapon in a vehicle.

It is a further object of the present invention to provide a weapon locking apparatus that can releasably lock a weapon on a gun mounting rack.

It is a further object of the present invention to provide a weapon locking apparatus for securing a weapon against unauthorized access.

It is a further object of the present invention to provide a weapon locking apparatus for a safety vehicle wherein access to a locked weapon is limited to authorized users.

It is a further object of the present invention to provide a weapon locking apparatus having a retractable, sliding latch for securing a weapon on the apparatus.

It is a further object of the present invention to provide a weapon locking apparatus with a magnetic lock having a processor controlled solenoid that alternately locks and unlocks the apparatus.

It is a further object of the present invention to provide a weapon locking apparatus with a processor controlled solenoid that alternately locks and unlocks a sliding latch.

It is a further object of the present invention to provide a magnetic lock for a weapon locking apparatus that deters unauthorized access to a weapon secured by the apparatus.

It is a further object of the present invention to provide a weapon locking apparatus that deters theft of a weapon from a motor vehicle.

It is a further object of the present invention to provide a weapon locking apparatus that can be installed quickly and efficiently.

It is a further object of the present invention to provide a weapon locking apparatus which allows an authorized user to readily release a lock head to access a weapon supported therein.

BRIEF DESCRIPTION OF THE DRAWINGS

Reference is made to the accompanying drawings in which are shown illustrative embodiments of the invention and from which novel features and advantages will be apparent.

DETAILED DESCRIPTION

Figure 1:
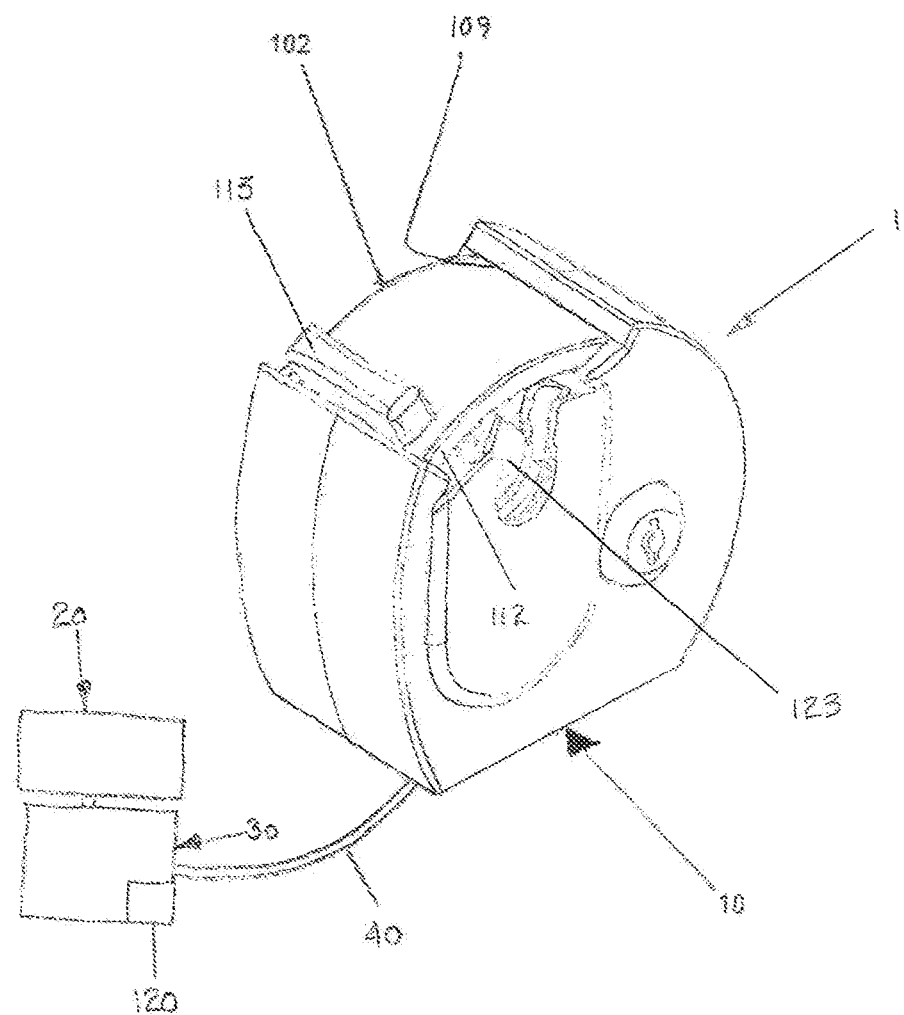
FIG. 1 is a perspective view of the weapon locking apparatus of a preferred embodiment of the present invention in which the sliding, latch is in the closed position.
Figure 2:
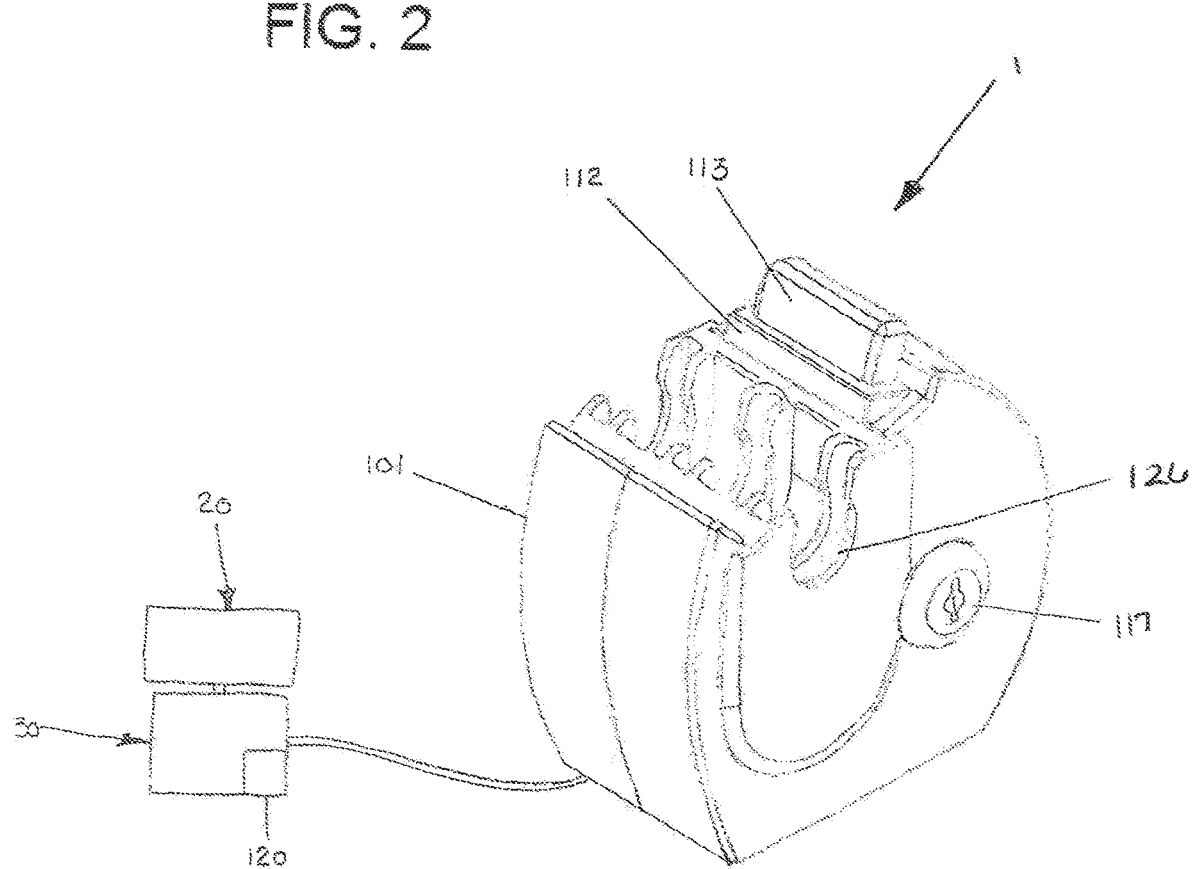
FIG. 2 is a perspective view of the weapon locking apparatus of FIG. 1 in which the sliding latch is in the opened position.
Figure 3:
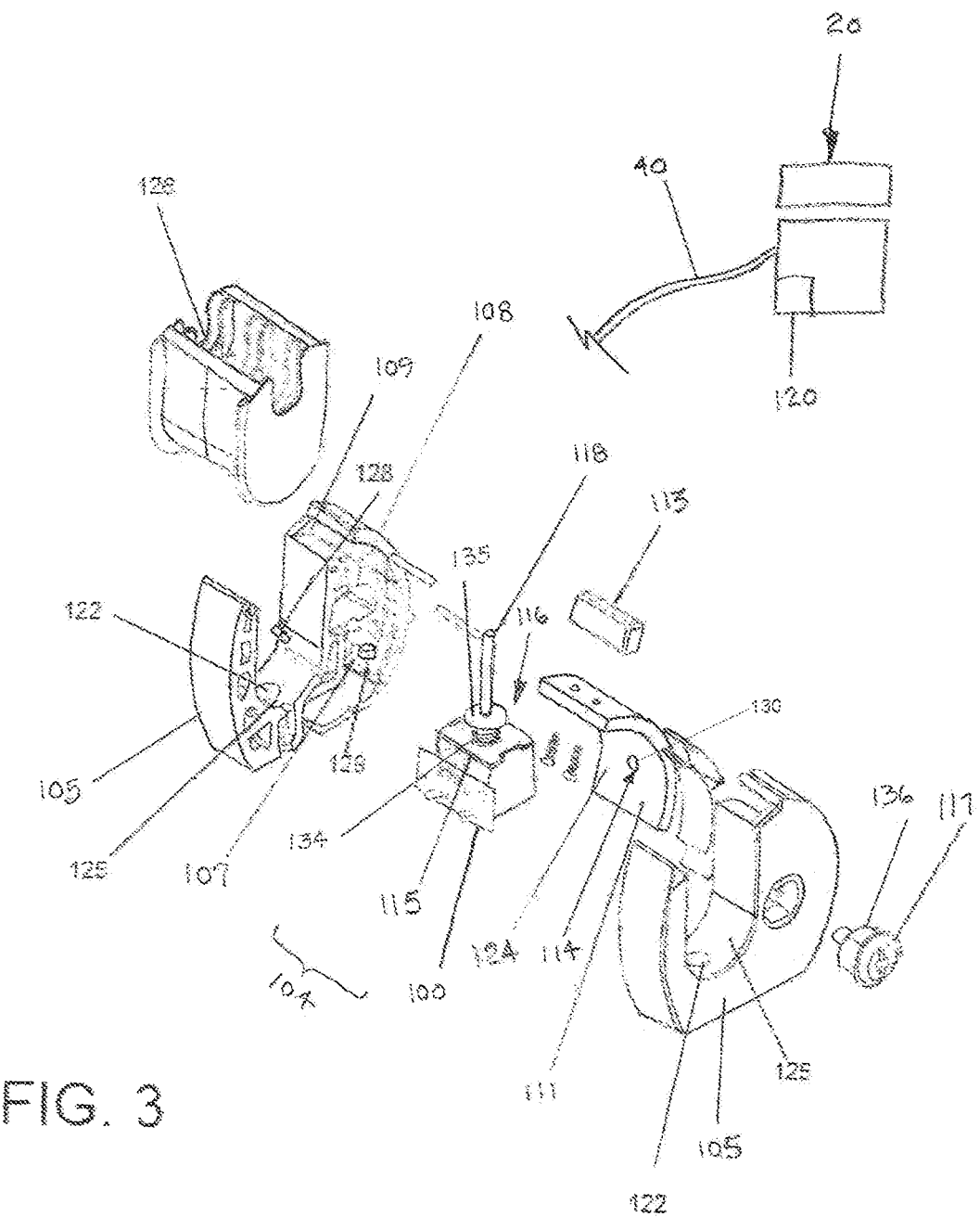
FIG. 3 is an exploded perspective view of the weapon locking apparatus of FIG. 1.
Figure 4:
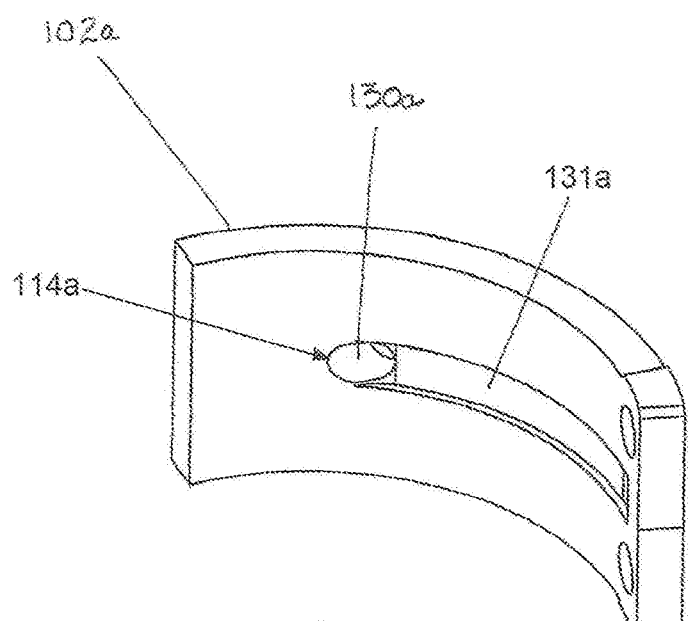
FIG. 4 is a perspective view of a second preferred embodiment, of the sliding latch of the weapon locking apparatus of the present invention.

A preferred embodiment of the weapon locking apparatus (1) of the present invention is shown in FIGS. 1-3 and includes a lock head (10), an actuator (20), a control module (30), and a conductor assembly (40).

The lock head (10) comprises a first processor (100), preferably a microprocessor, a chassis (101), a sliding latch (102), means for releasably locking the sliding latch and means for holding an article.

The chassis (101) comprises a housing (105) having an interior region (107) and means for mounting the weapon locking apparatus to a support. In a preferred embodiment, the means for mounting the weapon locking apparatus comprise a plurality of mounting holes (122) disposed on the housing (105).

The interior region (107) includes a latch holding area (108) and an access opening (109) into the latch holding area (108) of the interior region (107).

The sliding latch (102) has a first arcuate portion (124) with a mounted end (111) and a free end (112). A latch handle (113) is disposed on the free end (112) of the sliding latch (102). The sliding latch (102) also includes a plunger receiver (114). The sliding latch (102) further comprises an opened position and a closed position.

The control module (30) comprises a second processor (120), preferably a microprocessor.

The means for releasably locking the sliding latch comprise a lock assembly (104) that includes a primary magnetic lock (116) and a secondary manual lock (117).

The primary magnetic lock (116) has a magnetic latching solenoid (115) with an extensible and retractable plunger (118) that is adapted to selectively engage the plunger receiver (114) on the sliding latch (102). The plunger receiver (114) comprises a socket (130) preferably disposed proximate the mounted end (111) of the sliding latch (102).

The socket (130) is sized and shaped to receive the plunger (118) of the primary magnetic lock (116). The lock head (10) further comprises means for biasing the plunger and first (128) and second (129) magnets. In a preferred embodiment, the means for biasing the plunger comprises a spring (134). As shown in FIG. 3, the spring (134) is disposed between the magnetic latching solenoid (115) and a circumferential ridge (135) on the plunger (118). The spring (134) biases the plunger (118) in a direction toward the sliding latch (102). Although a coiled spring is shun in this preferred embodiment, other suitable biasing means could be used instead, including, but not limited to, an elastomeric or a leaf spring.

The secondary manual lock (117) is disposed on the chassis (101). The secondary manual lock (117) is preferably a dual lock cylinder (136) that can be accessed from either side and is activated using a key (not shown), whereby the plunger (118) can be manually extended and retracted.

In a preferred embodiment, the conductor assembly (40) has at least three conductors, such as wires, extending between the control module (30) and the lock head (10). One of the conductors provides power to the lock head (10). Another of the conductors transmits secure signals from the second processor (120) of the control module (30) to the first processor (100) of the lock head (10). The third conductor provides a ground for the weapon locking apparatus (1).

Although the preferred embodiment uses a wired assembly (40) for transmitting secure signals between the control module (30) and the lock head (10), other suitable transmitting means, such as a wireless system, could be used instead.

The means for holding an article comprise a cradle (123). The cradle (123) includes the first arcuate portion (124) and, a second arcuate portion (125). The first arcuate portion (124) comprises the sliding latch (102) and the second arcuate portion (125) comprises the chassis (101). Each of the arcuate portions (124,125) is generally U-shaped and cooperates with the other arcuate portion (124,125) to form the cradle (123). Preferably, a liner (126), constructed of rubber or other suitable material, is inserted into the second arcuate portion (125) to firmly secure and protect an article held therein. It should be noted that the cradle (123) is shaped to accommodate a variety of different firearms. However, the shape of the cradle (123) could be varied to include other shapes in order to hold other articles therein.

In a preferred embodiment, the weapon locking apparatus (1) is intended for use in a motor vehicle. As such, the actuator (20), which is preferably a momentary button switch, is used to activate the control module (30). When activated, the control module (30) functions to activate the magnetic latching solenoid (115) to unlock the lock head (10).

To access a weapon secured in the cradle (123), an authorized user engages the actuator (20). The actuator (20) then signals the control module (30). The second processor (120) in the control module (30) sends an encrypted signal to the lock head (10). The first processor (100) in the lock head (10) receives the signal and checks the authenticity of the signal. If the signal is deemed to be authentic, then the first processor (100) signals the magnetic latching solenoid (115) to retract the plunger (118). By retracting the plunger (118), the sliding latch (102) is unlocked and released to slide open.

Although a momentary button switch is used in the preferred embodiment, other suitable actuators for activating the series of events that results in unlocking the weapon locking apparatus (1) can be used instead. Suitable actuators include, but are not limited to, a radio frequency identification (RFID) card and a biometric fingerprint recognition unit.

Preferably, the power source for the weapon locking apparatus (1), when installed in a vehicle, is the vehicle battery. However, other suitable power sources, such as a separate battery dedicated solely to the weapon locking apparatus (1) could be used instead. Similarly, when used in a home or business, the weapon locking apparatus (1) can be powered by a battery or wired into an available electrical system.

The sliding latch (102) acts as a gate on the chassis (101) and can open or close to alternately allow access to the cradle (123) when opened or deny access to the cradle (123) when closed. The sliding latch (102) is at least partially mounted within the latch holding area (108) of the chassis (101). When the latch is in the opened position, the free end (112) of the sliding latch (102) is positioned proximate the access opening (109) of the latch holding area (108). With the sliding latch (102) opened, a user can readily retrieve a weapon from the cradle (123) of the weapon locking apparatus (1) or place a weapon into the cradle (123).

The sliding latch (102) can be opened or closed when the weapon locking apparatus (1) is in the unlocked configuration. When the sliding latch (102) is in the closed position, the first magnet (128) affixed to the chassis (101) acts upon the free end (112) of the sliding latch (102) to retain the sliding latch (102) in such closed position.

In the unlocked configuration, the sliding latch (102) can be moved between the closed and opened positions. This allows a user access into the cradle (123). Access can be gained by sliding the free end (112) of the sliding latch (102) toward the access opening (109). The latch handle (113) can be used to manually manipulate the sliding latch (102).

In the locked configuration, the sliding latch (102) is in the closed position and the free end (112) is adjacent to a portion of the chassis (101) generally opposite the access opening (109). The sliding latch (102) spans the second arcuate portion (125) of the chassis (101) and the plunger (118) is disposed within the socket (130) of the plunger receiver (114). As such, the sliding latch (102) blocks access into the cradle (123) and is locked against opening. When the plunger (118) is disposed within the socket (130) of the plunger receiver (114), the second magnet (129) affixed to the chassis (101) acts upon the plunger (118) to retain the plunger (118) within the socket (130). This ensures that in the event the weapon locking apparatus (1) is subjected to forces that would otherwise cause the plunger (118) to disengage from the socket (130), the plunger (118) is not dislodged.

The sliding latch (102) can be closed when the weapon locking apparatus (1) is in the unlocked configuration. However, when the apparatus (1) is in this unlocked configuration and the sliding latch (102) is closed, access to the cradle (123) can be readily achieved by sliding the sliding latch (102) to the opened position. With the weapon locking apparatus (1) in the unlocked configuration, the sliding latch (102) is free to slide into and out of the chassis (101) respectively opening and closing direct access into the cradle (123). Due to a timing function built into the first processor (100), discussed subsequently, the occurrence of this unlocked configuration is time-limited.

The plunger (118) on the magnetic latching solenoid (115) can be extended and retracted to lock and unlock the weapon locking apparatus (1) by respectively engaging and disengaging the sliding latch (102). When retracted, the plunger (118) is withdrawn from the socket (130) on the sliding latch (102) and the sliding latch (102) is free to slide between the closed and opened positions. With the sliding latch (102) in an opened position, a weapon or other article can be removed from or placed into the cradle (123).

When the sliding latch (102) is closed and the plunger (118) is extended into the socket (130), the weapon locking apparatus (1) is in the locked configuration, and the sliding latch (102) is deterred from opening. Consequently, access to a weapon or article held in the cradle (123) is denied.

Preferably, after the plunger (118) has been retracted for a predetermined amount of time, a timing function built into the first processor (100) automatically sends a lock signal to the magnetic latching solenoid (115) to extend the plunger (118) into the socket (130) on the sliding latch (102) and thereby relock the weapon locking apparatus (1).

The secondary manual lock (117) provides an alternative method for unlocking the weapon locking apparatus (1). It can be used, for example, in the event that the requisite power to operate the lock head (10) is interrupted. Using a key, the secondary manual lock (117) can be actuated to manually retract the plunger (118) from the socket (130) of the plunger receiver (114), thereby unlocking the lock head (10) and allowing the sliding latch (102) to be opened. With the sliding latch (102) opened, access to the cradle (123) is allowed. It is preferred that the secondary manual lock (117) only be used for unlocking the lock head (10) and that locking be accomplished by a lock signal from the first processor (100).

The cradle (123) of the weapon locking apparatus (1) is adapted for holding a weapon or various other types of articles therein. The first (124) and second (125) arcuate portions cooperate to secure at least a portion of the weapon or supported article when the weapon locking apparatus (1) is in, the locked configuration.

With the weapon locking apparatus (1) in the unlocked configuration, the plunger (118) is retracted from the socket (130) of the plunger receiver (114) and the sliding latch (102) can be moved between the opened and closed positions. The opened position includes those instances in which the sliding latch (102) is fully opened and at least partially opened. When the sliding latch (102) is in any of these opened positions, the plunger (118) is not aligned to extend into the socket (130). Instead the plunger (118) is biased outwardly and a tip of the plunger (118) engages the sliding latch (102). As the sliding latch (102) is moved, the tip of the plunger (118) rides along the first arcuate portion (124) on the latch.

The housing (105) of the weapon locking apparatus (1) provides protection for the primary magnetic lock (116) and the secondary manual lock (117), both of which are substantially contained within the housing's interior region (107). The housing (105) also contains varying proportional amounts of the sliding latch (102), the particular amount depending on the position of the sliding latch (102).

Regarding the primary magnetic lock (116), the magnetic latching solenoid (115) acts to lock the sliding latch (102) in the closed position against movement and also acts to unlock the sliding latch (102), thereby allowing the sliding latch (102) to slide. The magnetic latching solenoid (115) is activated through a signal received from the first processor (100). To unlock the weapon locking apparatus (1), the first processor (100) sends a signal to the magnetic latching solenoid (115) to establish a magnetic field with a polarity that retracts the plunger (118).

To lock the weapon locking apparatus (1), the first processor (100) sends a signal to the magnetic latching solenoid (115) to establish a magnetic field with a reverse polarity to thereby extend the plunger (118). In the event that the sliding latch (102) is in the closed position, the plunger (118) extends into the socket (130) and the apparatus (1) is locked. If the sliding latch (102) is not in the closed position when the plunger (118) is extended, the plunger (118) is not be in alignment with the socket (130) and therefore will not extend into the socket (130). Instead, a tip of the extended plunger (118) will engage a lower surface of the sliding latch (102) and as the sliding latch (102) closes, the tip of the plunger (118) rides along the surface of the sliding latch (102). When the socket (130) meets the tip of the plunger (118), the plunger (118) then extends into the socket (130) to lock the apparatus (1).

It is noted that the magnetic latching solenoid (115) comprises an earth magnet (not shown) that holds the plunger (118) in the retracted position when the sliding latch (102) is unlocked. The means for biasing the plunger biases the plunger (118) toward the extended position and can cause the plunger (118) to extend when a force sufficient to overcome the holding force of the earth magnet is applied to the plunger (118).

To use a preferred embodiment of the weapon locking apparatus (1), the actuator (20) is activated by a user and sends a signal to the control module (30). The control module (30) then sends an encrypted signal via the second processor (120) to the lock head (10). The first processor (100) on the lock head (10) receives the encrypted signal and verifies its authenticity. Upon verification by the first processor (100) of the encrypted signal from the control module (30), the first processor (100) sends a command to the magnetic latching solenoid (115) to retract the plunger (118) from its position within the socket (130). With the plunger (118) withdrawn from the socket (130), the weapon locking apparatus (1) is in the unlocked configuration, whereby the lock head (10) is unlocked, and the sliding latch (102) is free to move.

With the weapon locking apparatus (1) in the unlocked configuration, the sliding latch (102) can be opened by sliding the free end (112) of the sliding latch (102) toward the access opening (109). With the sliding latch (102) in the opened position, access is provided into the cradle (123). A weapon or other article can then be removed from or placed into the cradle (123).

In the event a signal received by the first processor (100) is determined to be inauthentic when the weapon locking apparatus (1) is in the locked configuration, no further action to unlock the weapon locking apparatus (1) occurs and the weapon locking apparatus (1) remains in the locked configuration.

Unlocking the weapon locking apparatus (1) activates the timing function built into the first processor (100) and after a predetermined period of time has elapsed, the first processor (100) sends a lock signal to the magnetic latching solenoid (115) and as a result, the plunger (118) is extended.

In the event that the sliding latch (102), shown in is closed when the plunger (118) is extended, the plunger (118) will move directly into the socket (130) of the plunger receiver (114) on the sliding latch (102) and the sliding latch (102) will be immediately locked.

However, if the sliding latch (102) is in an opened position when the plunger (118) is extended, then the outer tip of the plunger (118) engages a side of the sliding latch (102) instead of directly entering the plunger receiver (114). When the sliding, latch (102) is closed, the plunger (118) will extend into the plunger receiver (114) due to the biasing force of means for biasing the plunger, thereby securing the weapon locking apparatus (1) in the locked configuration.

Figure 5:
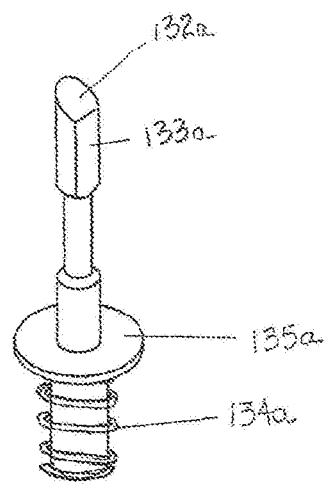
FIG. 5 is a perspective view of a second preferred embodiment of the plunger of the weapon locking apparatus of the present invention used with the sliding latch of FIG. 4.

A second preferred embodiment of the weapon locking apparatus (1a) is shown in FIGS. 4, 5 and 6A-6C. A sliding latch (102a) includes a plunger receiver (114a). The plunger receiver (114a) includes a socket (130a) and a groove (131a) disposed on the sliding latch (102a). The groove (131a) extends along a surface of the latch (102a) and is contiguous with the socket (130a). The plunger (118a), as shown in FIG. 5, includes a free end having a tip with a slanted surface (132a) thereon and a flat side surface (133a) extending from the slanted surface (132a) and down the length of the tip of the plunger (118a). The flat side surface (133a) abuts a wall of the interior region (107a) of the chassis (101a). The flat side surface (133a) prevents rotation of the plunger (118a) within the chassis (101a) and maintains the plunger's tip in proper alignment to be received within the groove (131a) and the socket (130a) of the plunger receiver (114a). Means for biasing the plunger is a spring (134a) that is disposed between the magnetic latching solenoid (115a) and a circumferential ridge (135a) on the plunger (118a).

Figure 6A:
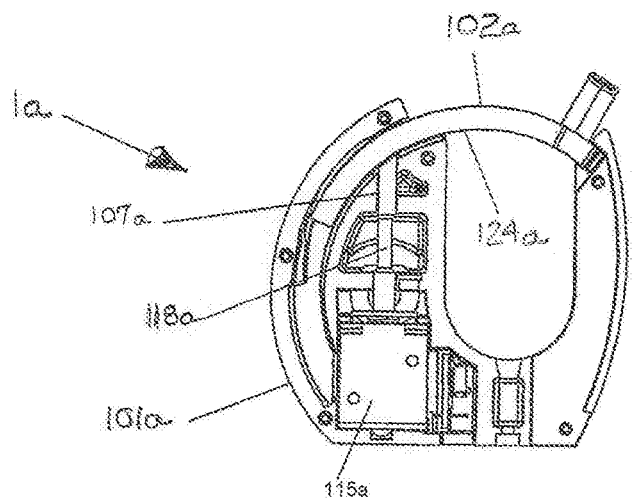
FIG. 6A is a cut away side view of a second preferred embodiment of the weapon locking apparatus of the present invention with the plunger of FIG. 5 shown in a fully retracted position.
Figure 6B:
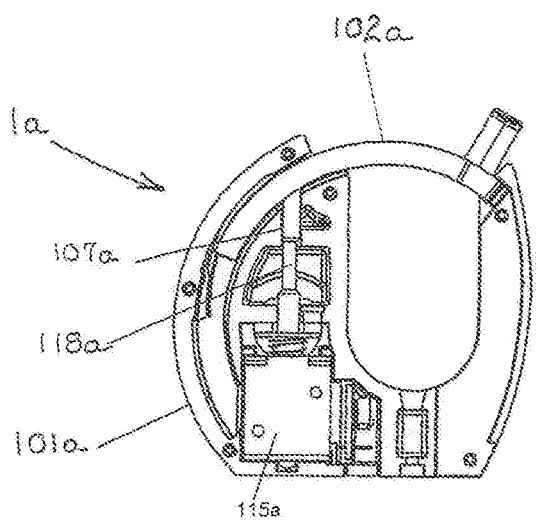
FIG. 6B is a cut away side view of the second preferred embodiment of the weapon locking apparatus of FIG. 6A showing the plunger in a partially retracted position.

The plunger (118a) is shown to be fully retracted from the plunger receiver (114a) in FIG. 6A. However, when the plunger (118a) is partially extended as shown in FIG. 6B, the slanted surface (132a) of the plunger's tip is disposed within the groove (131a). The slanted surface (132a) generally conforms t the curvature of the first arcuate portion (124a) on the latch (102a) in order to provide an efficient, continuous, contact between the tip of the plunger (118a) and the latch (102a), as the sliding latch (102a) moves between the opened and closed positions. Additionally, the slanted surface (132a) of the plunger (118a) provides a secure engagement with the socket (130a) when the latch (102a) is in the closed position.

Figure 6C:
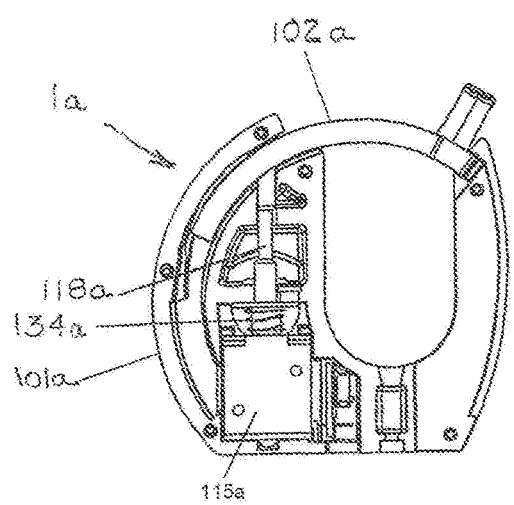
FIG. 6C is a cut away side view of the second preferred embodiment of the weapon locking apparatus of FIG. 6A showing the plunger in a fully extended position.

In the event that the sliding latch (102a) of this second preferred embodiment is fully closed when the plunger (118a) is extended, the plunger (118a) will move directly into the socket (130a), thereby securing the sliding latch (102a) and the weapon locking assembly (1) in the locked configuration with the plunger (118a) fully extended, as shown in FIG. 6C.

However, if the sliding latch (102a) is in an opened position when the plunger (118a) is extended, then the slanted surface (132a) on the tip of the plunger (118a) is extended into the groove (131a) of the plunger receiver (114a), as shown in FIG. 6B, instead of directly entering into the socket (130a). As the sliding latch (102a) is closed, the slanted surface (132a) on the tip of the plunger (118a) slides along within the groove (131a) until the tip of the plunger (118a) reaches the socket (130a). When the tip of the plunger (118a) reaches the socket (130a), the plunger (118a), aided by means for biasing the plunger, fully extends into the socket (130a), thereby securing the weapon locking apparatus (1) in the locked configuration, as shown in FIG. 6C.

It is noted that the weapon locking apparatus of the present invention can be used alone, in combination with gun mounting racks such as are typically used in motor vehicles and gun cabinets, or in any other suitable manner.

Although the present invention has been described in considerable detail with reference to certain preferred versions thereof, other versions are possible. Therefore, the spirit and scope of the appended claims should not be limited to the description of the preferred versions contained herein.

The invention claimed is:

1. A weapon locking apparatus for releasably securing a weapon against unauthorized removal from the weapon locking apparatus, said weapon locking apparatus comprising:
    a lock head;
    an actuator; and
    a control module;
    a locked configuration; and
    an unlocked configuration;
    said lock head comprises a sliding latch, a chassis, a first processor, means for releasably locking the sliding latch, and means for holding an article;
    said chassis comprises a housing having an interior region, a latch holding area within the interior region and an access opening into the latch holding area;
    said sliding latch includes opened and closed positions; wherein, said sliding latch is disposed in said access opening and extends into the latch holding area of the housing, whereby at least part of the sliding latch slides into and out of the interior region of the housing while moving between the opened and closed positions; in said opened position, said sliding latch allows access into said means for holding an article, and in said closed position, said sliding latch blocks access into said means for holding an article.

2. The weapon locking apparatus of claim 1, wherein said first processor comprises a microprocessor.

3. The weapon locking apparatus of claim 1, wherein said means for holding an article comprises a cradle having first and second arcuate portions, wherein said first arcuate portion is disposed on said sliding latch and said second arcuate portion is disposed on said chassis.

4. The weapon locking apparatus of claim 1, wherein said means for releasably locking the sliding latch comprises an extensible/retractable plunger;
    said sliding latch comprises a plunger receiver;
    wherein, when said weapon locking apparatus is in said locked configuration, said sliding latch is disposed in said closed position and said plunger extends into said plunger receiver.

5. The weapon locking apparatus of claim 3 further comprising a liner inserted into the second arcuate portion to secure and protect an article held therein.

6. The weapon locking apparatus of claim 4, wherein said plunger receiver comprises a socket;
wherein, in said locked configuration, said plunger engages said socket, and in said unlocked configuration, said plunger is disengaged from said socket.

7. A weapon locking apparatus for releasably securing a weapon against unauthorized removal from the weapon locking apparatus, said weapon locking apparatus comprising:
a lock head;
an actuator; and
a control module;
a locked configuration; and
an unlocked configuration;
said lock head comprises a sliding latch, a chassis, a first processor, means for releasably locking the sliding latch, and means for holding an article;
said chassis comprises a housing having an interior region, a latch holding area within the interior region and an access opening into the latch holding area;
said sliding latch includes opened and closed positions; wherein said sliding latch is disposed in said access opening and extends into the latch holding area of the housing, whereby at least part of the sliding latch slides into and out of the latch holding area while moving between the opened and closed positions; wherein, in said opened position, said sliding latch allows access into said means for holding an article; and wherein, in said closed position, said sliding latch blocks access into said means for holding an article;
said means for releasably locking the sliding latch comprises an extensible/retractable plunger;
said sliding latch comprises a plunger receiver; and
said plunger receiver comprises a socket and a groove on said sliding latch, wherein said groove is contiguous with said socket;
said means for releasably locking the sliding latch further comprises means for biasing the plunger toward the sliding latch;
wherein, when said weapon locking apparatus is in said locked configuration, said sliding latch is disposed in said closed position and said plunger extends into said socket; and in said unlocked configuration, said plunger is disengaged from said socket; and
wherein said plunger is extended into said groove by said means for biasing when said weapon locking apparatus is in said unlocked configuration and said sliding latch is at least partially in said opened position.

8. The weapon locking apparatus of claim 7, wherein said plunger comprises a slanted surface at one end thereof for removably engaging said plunger receiver of the sliding latch.

9. The weapon locking apparatus of claim 8 wherein said plunger comprises a flat side surface extending along at least a portion of the plunger and engaging an interior surface of said chassis.

10. A weapon locking apparatus for releasably locking an article against unauthorized removal from the weapon locking apparatus, the weapon locking apparatus comprising:
a lock head;
an actuator; and
a control module;
said lock head including a chassis, a sliding latch, a first processor, a cradle for receiving the article, and a lock assembly;
wherein said chassis comprises a housing having an interior region, a latch holding area within the interior region and an access opening into the latch holding area;
said latch including opened and closed positions;
wherein said sliding latch is disposed in said access opening and extends into the latch holding area of the housing, whereby at least part of the sliding latch slides into and out of the interior region of the housing while moving between the opened position and the closed position;
said control module comprising a second processor;
said weapon locking apparatus further including locked and unlocked configurations; and
wherein, when said weapon locking apparatus is in said locked configuration, said sliding latch is in said closed position, the sliding latch is locked against movement and access to said cradle is blocked; and
wherein when said weapon locking apparatus is in said unlocked configuration, said sliding latch is released to move between said opened and closed positions; and
when said sliding latch is in the opened position, access into the cradle is allowed.

11. The weapon locking apparatus of claim 10, wherein the first processor comprises a microprocessor and the second processor comprises a microprocessor.

12. The weapon locking apparatus of claim 10 further comprising a conductor assembly that provides power to the lock head from a power source and transmits signals between the control module and the lock head;
wherein said actuator is activated by a user thereby sending a signal to the control module which causes the second processor of the control module to send an encrypted signal to the lock head which is received by the first processor in the lock head to be authenticated by the first processor; and upon authentication of the signal, the first processor sends a signal to the lock assembly to move the weapon locking apparatus into the unlocked configuration, thereby allowing access into the cradle.

13. The weapon locking apparatus of claim 12, wherein, when the weapon locking apparatus moves into the unlocked configuration, the first processor activates a timing function such that when a predetermined amount of time has elapsed, the first processor commands the lock assembly to move the weapon locking apparatus into the locked configuration.

14. The weapon locking apparatus of claim 10, wherein said lock assembly comprises a primary magnetic lock having a magnetic latching solenoid and an extensible/retractable plunger.

15. The weapon locking apparatus of claim 14, wherein said sliding latch includes a free end, a mounted end and a plunger receiver;
wherein said plunger extends and retracts to lock and release the sliding latch;
wherein in the locked configuration, the sliding latch is in the closed position and the plunger is extended into said plunger receiver; and
wherein in the unlocked configuration, the plunger is retracted from the plunger receiver with the sliding latch released to allow movement away from the closed position to the opened position.

16. The weapon locking apparatus of claim 10, wherein said lock head further comprises a secondary manual lock.

17. The weapon locking apparatus of claim 16, wherein said secondary manual lock comprises a dual lock cylinder that can be manually unlocked from either of two opposing sides.

18. The weapon locking apparatus of claim 15, further comprising a first magnet for holding the sliding latch in the closed position, and a second magnet for holding the plunger in the plunger receiver.

19. The weapon locking apparatus of claim 12, wherein, when the encrypted signal is determined by the first processor to be inauthentic, the first processor does not send a signal to the lock assembly to move the weapon locking apparatus into the unlocked configuration, thereby denying access into the cradle.

20. The weapon locking apparatus of claim 14, wherein said primary magnetic lock includes a means for biasing the plunger, and said plunger receiver comprises a groove and a socket;
    wherein said groove extends along the sliding latch and is contiguous with the socket, and said plunger is biased toward said sliding latch.

21. The weapon locking apparatus of claim 20, wherein, in the locked configuration, the sliding latch is in the closed position and the plunger extends into the socket.

22. The weapon locking apparatus of claim 21, wherein said plunger comprises a slanted surface on an outer end thereof; and
    wherein, when the weapon locking apparatus is in the unlocked configuration and the sliding latch is at least partially opened, said slanted surface of the plunger is received within the groove of the plunger.

23. The weapon locking apparatus of claim 22, wherein said plunger comprises a flat side surface; and
    wherein said flat side surface of the plunger abuts a surface of the interior region of the housing.

24. The weapon locking apparatus of claim 20, wherein said means for biasing the plunger comprises a spring;
    said plunger comprises a circumferential ridge; and
        wherein said spring is disposed between said circumferential ridge and said magnetic latching solenoid.

25. The weapon locking apparatus of claim 10 further comprising a liner inserted into the cradle to secure and protect an article held therein.

26. A weapon locking apparatus for releasably locking an article against unauthorized removal, said weapon locking apparatus comprising:
    a lock head;
    an actuator;
    a control module; and
    a conductor assembly;
    said lock head including a chassis, a sliding latch, a first processor, a primary magnetic lock, a secondary manual lock, and a cradle for holding an article therein;
    said chassis includes a housing comprising an interior region that includes a latch holding area and an access opening extending into the latch holding area;
    said sliding latch defines a first arcuate portion and includes a free end, a mounted end, a latch handle, and a plunger receiver;
    wherein said sliding latch is disposed in the access opening and is at least partially positioned within the latch holding area, whereby at least part of the sliding latch slides into and out of the interior region of the housing while moving between the opened position and the closed position;
    said plunger receiver comprises a socket;
    said primary magnetic lock is disposed in the interior region of said chassis and said secondary manual lock is at least partially disposed in said interior region; and
    said cradle is defined by the first arcuate portion on said sliding latch and a second arcuate portion on said chassis;
    said primary magnetic lock comprises a magnetic latching solenoid, an extensible/retractable plunger, a first magnet for holding the latch closed, a second magnet for holding the plunger in said plunger receiver, and a spring for biasing the plunger toward the sliding latch; wherein said plunger alternately extends into and retracts from said plunger receiver;
    said control module comprises a second microprocessor;
    said conductor assembly transmits power to the lock head, transmits secure signals from the second processor to the first processor, and provides a ground for the weapon locking apparatus;
    wherein said weapon locking apparatus further includes locked and unlocked configurations, and said sliding latch includes opened and closed positions;
    wherein, when said sliding latch is in said opened position, access into the cradle is allowed; and when said sliding latch is in said closed position, access into the cradle is blocked;
    wherein, when said weapon locking apparatus is in said locked configuration, said sliding latch is in said closed position and said plunger is disposed in said socket of the plunger receiver; and
    wherein, when said weapon locking apparatus is in said unlocked configuration, said plunger is disengaged from said socket of the plunger receiver, and said latch is allowed to move between said opened position and said closed position;
    wherein, to remove an article from the weapon locking apparatus, the actuator is activated by a user; the activated actuator sends a signal to the control module; the second processor of the control module receives the signal from the actuator; the second processor sends an encrypted signal to the first processor within the lock head for authentication; when the signal from the second processor is authenticated by the first processor, the first processor sends a signal to the primary magnetic lock; the magnetic latching solenoid of the primary magnetic lock responds to the signal by establishing a magnetic field with a polarity to thereby retract the plunger from the socket of the plunger receiver so that the weapon locking apparatus is in the unlocked configuration; the sliding latch is moved into the opened position; and the article can be removed from or placed into the cradle;
    wherein, when the weapon locking apparatus enters into the unlocked configuration, the first processor activates a timing function such that when a predetermined amount of time has elapsed, the first processor sends a signal to the magnetic latching solenoid to establish a magnetic field with a reverse polarity to extend the plunger; when the sliding latch is in the closed position the plunger extends into said socket of the plunger receiver and the weapon locking apparatus is returned to the locked configuration from the unlocked configuration; when the sliding latch is at least partially opened, the plunger is urged toward the sliding latch by means for biasing and is partially extended to engage the arcuate portion of the sliding latch; the sliding latch is then moved into the closed position whereby the plunger fully extends into said socket and into the locked configuration;

alternatively, when the encrypted signal is verified by the first processor to be inauthentic, said control module fails to send a signal to the primary magnetic lock and the plunger remains in said socket of the plunger receiver so that the weapon locking apparatus continues to be in the locked configuration.

27. The weapon locking apparatus of claim 26, wherein said plunger receiver of the sliding latch further comprises a groove, wherein said groove extends along the sliding latch and is contiguous with the socket;

said plunger comprises a slanted surface and a flat side surface; wherein said slanted surface is disposed at an outer tip of the plunger and said flat side surface extends along a length of the plunger and abuts a surface of the interior region of the housing;

wherein, in said locked configuration, said plunger is extended into said socket; and wherein, in said unlocked configuration, the plunger is retracted and disengaged from the socket; and in said unlocked configuration, when said plunger is not fully retracted, the slanted surface of the plunger engages the groove.

28. A weapon locking apparatus for releasably securing a weapon against unauthorized removal from the weapon locking apparatus, said weapon locking apparatus comprising:

a lock head;
an actuator; and
a control module;
a locked configuration; and
an unlocked configuration;

said lock head comprises a sliding latch, a chassis, a first processor, means for releasably locking the sliding latch, and means for holding an article;

said means for releasably locking the sliding latch comprises an extensible/retractable plunger and means for biasing the plunger toward the sliding latch;

said sliding latch comprises a plunger receiver;

said plunger comprises a slanted surface at one end thereof for removably engaging said plunger receiver;

said plunger receiver comprises a socket and a groove disposed on said sliding latch, wherein said groove is contiguous with said socket;

wherein said sliding latch further includes opened and closed positions and said sliding latch slides into and out of the interior region of the housing between said opened and closed positions;

wherein, in said opened position, said sliding latch allows access into said means for holding an article, and in said closed position, said sliding latch blocks access into said means for holding an article;

wherein, when said weapon locking apparatus is in said locked configuration, said sliding latch is disposed in said closed position and said plunger extends into said socket;

wherein, when said weapon locking apparatus is in said unlocked configuration, said plunger is disengaged from said socket; and wherein said plunger is extended into said groove by said means for biasing when said weapon locking apparatus is in said unlocked configuration and said sliding latch is at least partially in said opened position.

* * * * *